United States Patent [19]

Morimoto

[11] Patent Number: 5,340,053
[45] Date of Patent: Aug. 23, 1994

[54] CLUTCH MECHANISM OF DOUBLE-BEARING REEL

[75] Inventor: Shinichi Morimoto, Sakai, Japan

[73] Assignee: Shimano Inc., Osaka, Japan

[21] Appl. No.: 35,487

[22] Filed: Mar. 22, 1993

Related U.S. Application Data

[63] Continuation of Ser. No. 664,821, Mar. 5, 1991, abandoned.

[30] Foreign Application Priority Data

Mar. 19, 1990 [JP] Japan .................. 2-28781[U]

[51] Int. Cl.⁵ .................................................. A01K 89/033
[52] U.S. Cl. ................................................................ 242/261
[58] Field of Search ................ 242/259, 260, 261, 262

[56] References Cited

U.S. PATENT DOCUMENTS

| | | | |
|---|---|---|---|
| 4,379,530 | 4/1983 | Kobayashi | 242/261 |
| 4,406,427 | 9/1983 | Murakami | 242/261 |
| 4,564,158 | 1/1986 | Moosberg et al. | 242/261 |
| 4,593,869 | 6/1986 | Yasui et al. | 242/261 |
| 4,648,566 | 3/1987 | Furomoto | 242/259 X |
| 4,798,355 | 1/1989 | Kaneko | 242/261 |
| 4,824,046 | 4/1989 | Emura et al. | 242/261 |
| 4,850,550 | 7/1989 | Aoki | 242/261 |
| 5,058,823 | 10/1991 | Emura et al. | 242/261 |

FOREIGN PATENT DOCUMENTS

60-78526 5/1985 Japan .................. 242/262
62-198972 12/1987 Japan .

Primary Examiner—Daniel P. Stodola
Assistant Examiner—Michael R. Mansen
Attorney, Agent, or Firm—Dickstein, Shapiro & Morin

[57] ABSTRACT

A fishing reel has a clutch and a selector mechanism for selectively providing a toggle mode where at least the clutch is maintained at the disengaged state with operation of a control member from a first position to a second position and a momentary mode where with release of the operation of the control member the control member is returned to the first position for returning the clutch to the engaged state. The clutch is a swivel operation type mechanism engaged with swivel operation of a swivel member into an engaging range and disengaged with further swivel operation of the swivel member into a disengaging range. A dead point is provided within the disengaging range for rendering the swivel member or a control unit therefor inoperative so as to allow a toggle member to provide urging force to maintain at least the clutch at the engaged state. The selector mechanism includes a limiting member switchable between a position for preventing the swivel member from reaching the dead point of the toggle member when the swivel member is operated by the control member from the engaging range to the disengaging range and a further position for allowing the swivel member to swivel beyond the dead point.

5 Claims, 4 Drawing Sheets

CLUTCH MECHANISM OF DOUBLE-BEARING REEL

This application is a continuation of application Ser. No. 07/664,821 filed Mar. 5, 1991, now abandoned.

BACKGROUND OF THE INVENTION

1 Field of the Invention

The present invention relates to a fishing reel, and more particularly to a double-bearing type fishing reel including a spool, a handle for rotating the spool, a clutch mechanism disposed between the spool and the handle, a control member operable into a first position for engaging the clutch mechanism and a second position for disengaging the clutch mechanism to allow free rotation of the spool and a selector mechanism for selectively providing a toggle mode where at least the clutch mechanism is maintained at the engaged state thereof with operation of the control member from the first position to the second position and a momentary mode where with release of the operation of the control member the control member is returned to the first position for returning the clutch mechanism to the engaged state thereof.

2 Description of the Related Art

A typical conventional fishing reel of the above-described type is known from e.g. a Japanese laid-open patent gazette No. 60-78526 or from a Japanese laid-open utility model gazette No. 62-198972. With the former convention, a coil spring is provided through one terminal end thereof for urging the control member, whereas the other terminal end of the spring is supported to a controlled member which position is variable. With this, during use of the reel, the toggle mode and the momentary mode are switched over therebetween through selection of a position of the controlled member. With the latter convention, the reel has a return spring for constantly urging the control member to its home position and a toggle spring having a stronger urging force than the return spring for toggling the control member by overriding the urging force of the return spring. Then, through operation of the control member for switchably providing the first state where the toggle spring is effective and the second state where the toggle spring is ineffective, the toggle mode and the momentary mode are switched over therebetween.

The controlled member of the former convention and the control member of the latter convention respectively correspond to the selector mechanism described above.

These conventions have drawbacks to be described next.

That is, with the former convention, the construction uses a single spring and therefore has the merit of reduction in the number of parts employed. On the other hand, since the mode switching operation is effected through the variation of the position of one terminal end of the spring, the operation requires a significantly large amount of manual force.

The latter convention too suffers the same problem of requirement of strong manual force for the mode switching operation. In this respect, both types of convention have room for improvement.

Taking the above-described state of the art into consideration, the primary object of the present invention is to provide a fishing reel of the above type with improvement which facilitates the mode switching operation between the toggle mode and the momentary mode and which achieves this operational ease with a minimum number of parts for the construction.

SUMMARY OF THE INVENTION

For accomplishing the above-noted object, a fishing reel, according to the present invention, comprises: a spool; a handle for rotating the spool; a clutch mechanism disposed between the spool and the handle; a control member operable into a first position for engaging the clutch mechanism and a second position for disengaging the clutch mechanism to allow free rotation of the spool; a selector mechanism for selectively providing a toggle mode where at least the clutch mechanism is maintained at the disengaged state thereof with operation of the control member from the first position to the second position and a momentary mode where with release of the operation of the control member the control member is returned to the first position for returning the clutch mechanism to the engaged state thereof; wherein the clutch mechanism is a swivel operation type mechanism engaged with swivel operation of a swivel member into an engaging range and disengaged with further swivel operation of the swivel member into a disengaging range; a dead point being provided within said disengaging range for rendering the swivel member or a control unit therefor inoperative so as to allow toggle means to provide urging force to maintain at least the clutch mechanism at its engaged state; the selector mechanism including a limiting member switchable between a position for preventing the swivel member from reaching said dead point of the toggle means when swivel member is operated by the control member from said engaging range to said disengaging range and a further position for allowing the swivel member to swivel beyond said dead point.

Functions and effects of the above-described construction will be described next.

FIGS. 1 through 3 show a sample embodiment of the above construction. According to this construction, with selection of the toggle mode by operation of the selector mechanism, as shown in FIGS. 1 and 2, when the control member 6 is operated from the first position P1 towards the second position P2, the construction allows this control member 6 to reach the second position P2. In the course of this operation, a swivelling motion of the swivel member 23 causes a toggle spring 29, as an example of the toggle means, to move beyond the dead point DP, thus maintaining the clutch mechanism C at the disengaged state.

In this toggle mode, the control member 6 is maintained at the first position P1 as well by means of the urging force of the toggle spring 29.

On the other hand, with selection of the momentary mode by operating the selector mechanism D, as shown in FIG. 3, if the control member 6 is operated from the first position P1 towards the second position P2, this operation is prevented by the limiting member, such that the toggle spring 29 can not move beyond the dead point DP. Yet, while this control member 6 can not reach the second position P2, the swivel member has reached its disengaging range and the toggle spring 29 keeps applying the urging force to the control member 6 to return it to the first position P1.

That is to say, according to the construction of the present invention, through appropriate settings of e.g. the correlation between the clutch mechanism C and the control member 6, the position of the dead point DP and the limiting position of the selector mechanism D, the construction can selectably provide the toggle mode and the momentary mode without utilizing the disadvantageous constructions of the convention.

As discussed above, the present invention has fully achieved its intended primary object of providing a fishing reel with improvement which facilitates the mode switching operation between the toggle mode and the momentary mode and which achieves this operational ease with a minimum number of parts for the construction.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate one preferred embodiment of a fishing reel relating to the present invention; in which.

DESCRIPTION OF THE PREFERRED EMBODIMENTS

Preferred embodiments of a fishing reel relating to the present invention will now be described in particular with reference to the accompanying drawings.

Figure 4:
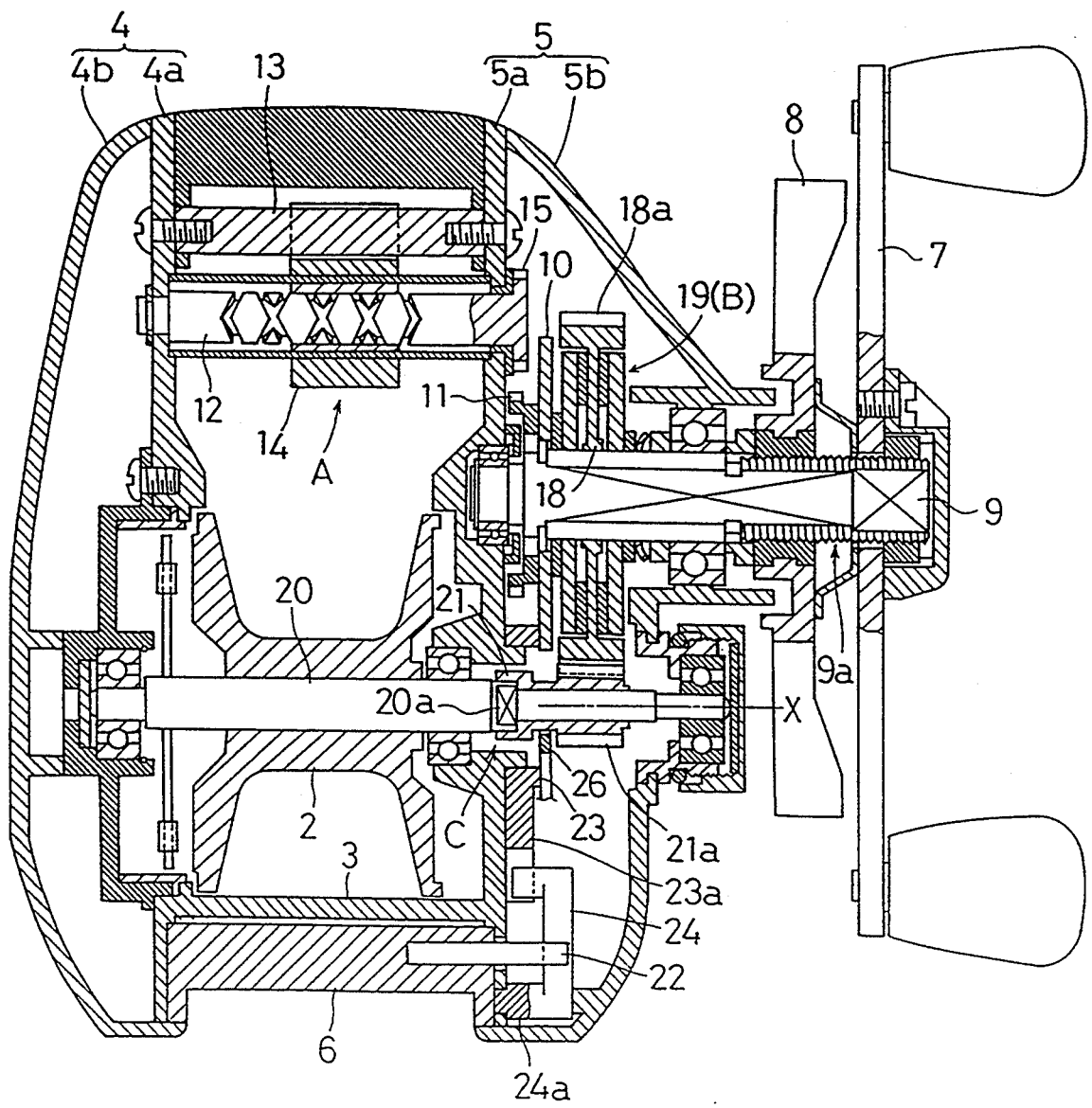
FIG. 4 is a plan view in section of the fishing reel.
Figure 5:
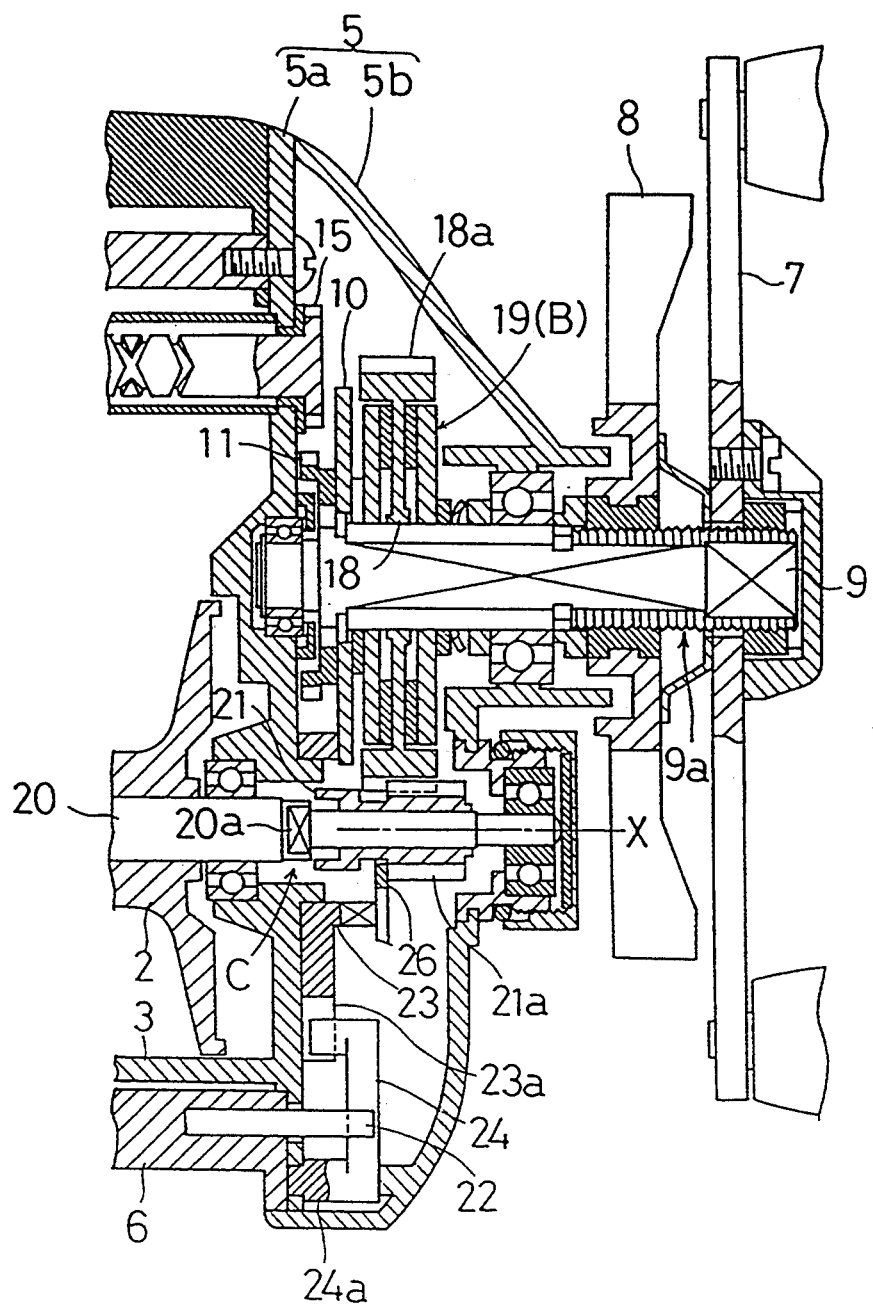
FIG. 5 is a partial section of the fishing reel where the clutch mechanism is engaged.

As shown in FIGS. 4 and 5, a double-bearing type fishing reel of one embodiment of the invention includes a level-wind mechanism A, a spool 2 and a thumb rest 3 interposed between a pair of right and left side cases 4, 5 in the mentioned order at forward, middle and rear positions of a reel body, respectively as being attached to an unillustrated fishing rod. Rearwardly of the thumb rest 3, there is provided a control member 6 operable by depression to render the spool 2 freely rotatable. Further, to an outer side of the right side case 5, there are attached a wind-up handle 7 and a star-shaped drag adjustment member 8.

As shown in FIG. 4, the side cases 4 and 5 respectively include side plates 4a, 5a and outer wall members 4b, 5b for covering outer sides of the side plates 4a, 5a. A rotary shaft 9 associated with the handle 7 is extended between the right side plate 5a and the right outer wall member 5b.

The drag adjustment member 8 is screwed on a threaded portion 9a formed on an outer end of the rotary shaft 9. Whereas, at inner positions of this rotary shaft 9, there are attached a drag mechanism B, a ratchet wheel 10 (an example of gear member) and a transmission gear 11 for transmitting force to the level-wind mechanism A.

The level-wind mechanism A has a line guide member 14 which is reciprocable along a guide rod 13 in association with rotation of a spiral shaft 12. The force from the transmission gear 11 is transmitted through an intermediate gear 16 to a gear 15 fitted on an end of the spiral shaft 12 of the level-wind mechanism A.

The ratchet wheel 10 has a plurality of radially projecting teeth 10a in its outer periphery. Further, adjacent this ratchet wheel 10, there is provided a claw member 17 constantly urged in a direction to engage the teeth 10a, so that the ratchet wheel 10 functions to prevent reverse rotation of the rotary shaft 9.

The rotary shaft 9 supports a free disc 18 having an outer gear 18a in its outer periphery. And, the drag mechanism B, disposed across the free disc 18, has friction plates 19, 19 fitted on the rotary shaft 9 for applying friction force thereto. Accordingly, the friction force is adjustable by adjustably rotating the drag adjustment member 8.

The spool 2 has a spool shaft 20 rotatable with this spool 2; and an engaging portion 20a is formed at an intermediate position of this spool shaft 20. Further, the spool shaft 20 loosely supports a slide element 21 slidable to engage the engaging portion 20a and having an input gear 21a engageable with an output gear 18a of the free disc 18. Accordingly, if the handle 7 is rotated when the slide element 21 is engaged with the engaging portion 20a, the spool 2 is rotated to take up a fishing reel thereabout.

The above-described, slide element 21 and the engaging portion 20a together constitute a clutch mechanism C. For casting the fishing line from the reel, the slide element 21 is slided into a position shown in FIG. 5 for disengaging the clutch mechanism C. Then, as the fishing rod is swung, the spool 2 effects free rotation as being pulled by tension of the fishing line, thus feeding the line from the reel.

With the reel of this particular embodiment, the setting of the spool 2 for free rotation, i.e. disengagement of the clutch mechanism C is effected by a depressing operation of the control member 6. Next, the construction of this control member 6 will be more particularly described.

The control member 6 is supported to the right and left side plates 4a, 5a to be vertically movable relative thereto. The control member 6 has a projecting pin 22 at a lateral end thereof. On the other hand, a cam disc 23 (an example of a swivel member) rotatably supported on the spool shaft 20 to be rotatable about an axis of this shaft 20 is operatively connected with a swivel element 24 having its intermediate portion depressed by the projecting pin 22 of the control member 6 and its rear end portion 24a pivotably supported to the right side plate 5a.

Figure 1:
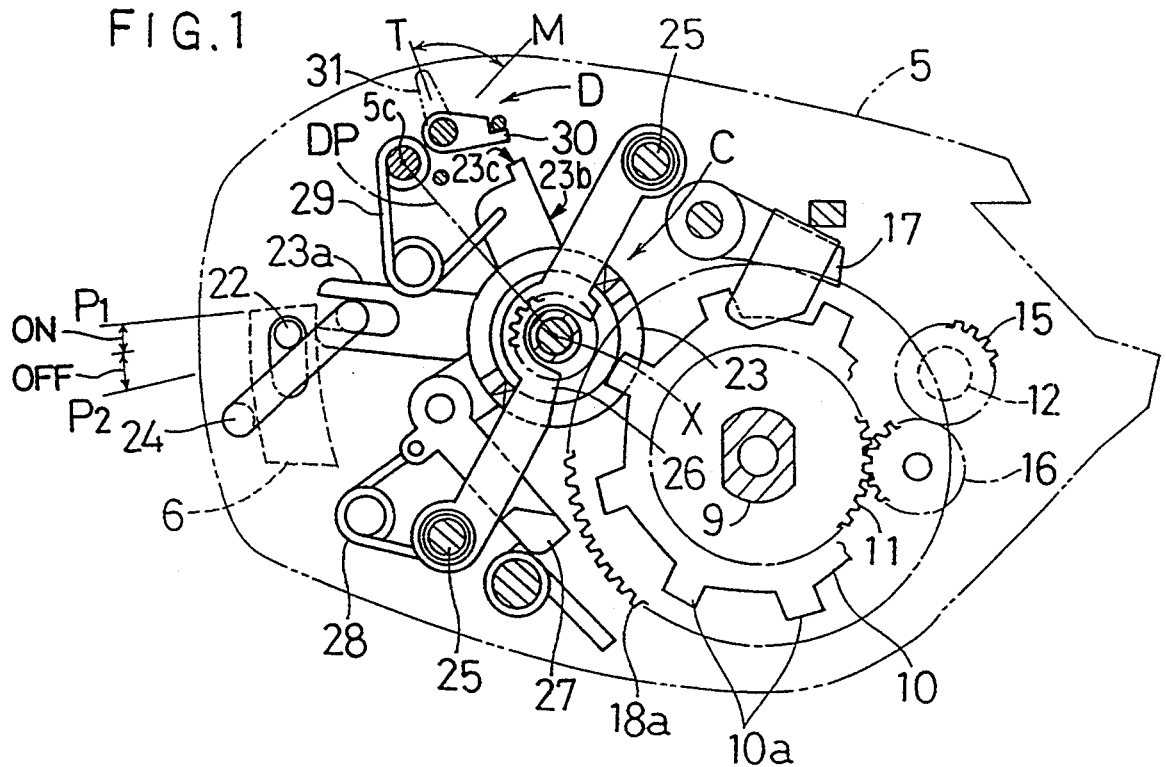
FIG. 1 is a side view of the fishing reel in which a clutch mechanism is engaged in a toggle mode.
Figure 2:
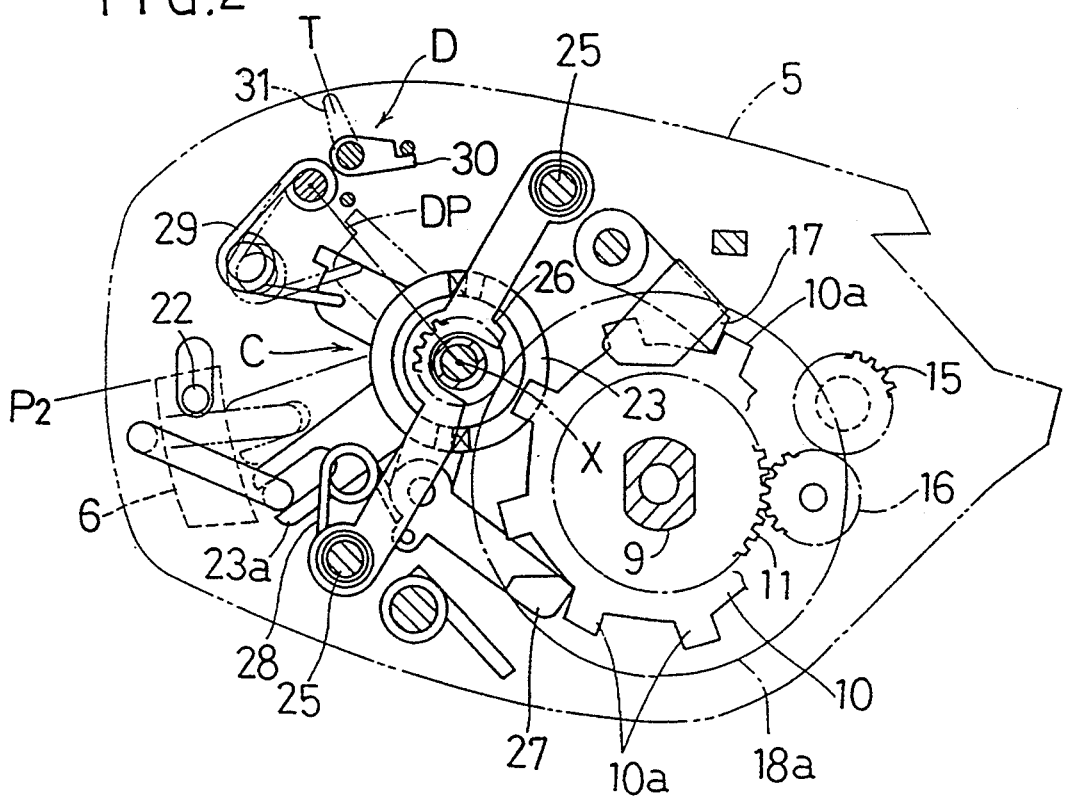
FIG. 2 is a side view of the fishing reel in which the clutch mechanism is disengaged in the toggle mode.
Figure 3:
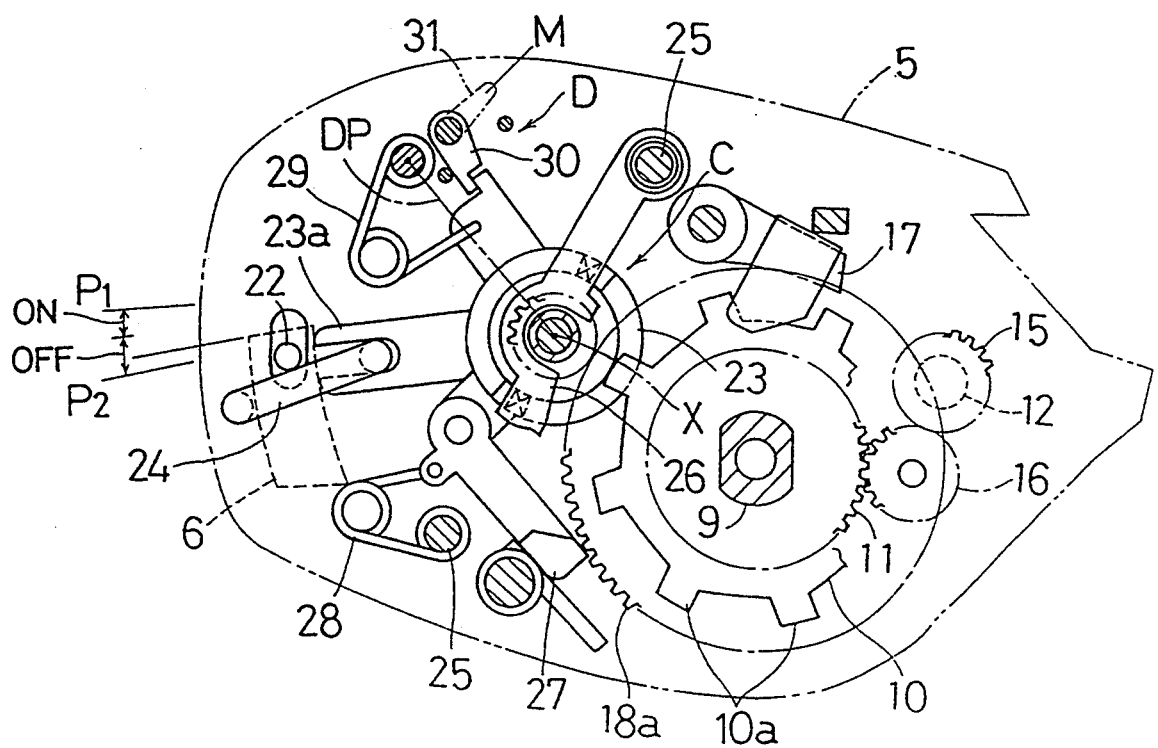
FIG. 3 is a side view in which the clutch mechanism is disengaged in a momentary mode.

On the other hand, as shown in FIGS. 1 through 3, the slide element 21 is engaged with a shifter 26 movable along a pair of shafts 25, 25 disposed parallel with and at upper and lower positions relative to the spool shaft 20. The cam disc 23 pivotably supports a return element 27 via a support shaft disposed parallel with a rotational axis X of the cam disc 23. Further, a spring 28 having a relatively small urging force is provided for switching over the return element 27 between its position engaging with the teeth 10a of the ratchet wheel 10 and its further position disengaged therefrom.

The position of the control member 6 for engaging the clutch mechanism C and the further position of this member 6 for disengaging the clutch mechanism C will be referred to, hereinafter, as a first position P1 and a second position, respectively. That is, the fishing reel of the present invention further includes a selector mechanism D for selectively providing a toggle mode where at least the clutch mechanism C is maintained at the disengaged state thereof with operation of the control member 6 from the first position P1 to the second position P2 and a momentary mode where with release of the operation of the control member 6 the control member 6 is returned to the first position P1 for returning the clutch mechanism C to the engaged state thereof.

That is, the cam disc 23 is swivable between an engaging range ON for engaging the clutch mechanism C and a disengaging range OFF for disengaging the mechanism C. Further, with this cam disc 23, a dead point DP is provided within the disengaging range OFF so as to allow a toggle spring 29 mounted on projection 5c to provide an urging force to maintain the clutch mechanism C either at the engaged state or the disengaged state. Moreover, there is provided a limiting member switchable between a position for engaging the limiting projection 23c thereby preventing the engaging portion 23b of the cam disc 23 from reaching the dead point DP of the toggle spring 29 when the cam disc 23 is operated by the control member 6 from the engaging range ON to the disengaging range OFF and a further position for allowing the cam disc 23 to swivel beyond the dead point DP.

The limiting member 30 is pivotably supported to the outer wall member 5b of the right side case 5 and is switched over between a toggle mode position T and a momentary mode position M by operation of a switching lever 31. Then, the limiting member 30 and the switching lever 31 together comprise the selector mechanism D.

In operation, when the switching lever 31 is set to the toggle mode position T to operate the control member 6 from the first position P1 to the second position P2, the toggle spring 29 moves beyond the dead point DP, whereby the control member 6 is maintained at the second position P2. Thereafter, with rotation of the handle 7 in the line take-up direction, the return element 27 is pushed backwards by the rotational force of the teeth 10a of the ratchet wheel 10 and this returning force returns the cam disc 23 beyond the dead point DP, whereby the control member 6 is maintained at the first position P1.

On the other hand, when the switching lever 31 is set to the momentary mode position M to move the control member 6 from the first position P1 towards the second position P2, this movement is interfered before the member 6 reaches the second position P2; yet, the clutch C is disengaged. Further, with release of the operational force, the control member 6 is returned to the first position P1 by means of the urging force of the toggle spring 29.

Some other embodiments of the invention will be specifically described next.

In the foregoing embodiment, the toggle means comprises the toggle spring 29 shown in FIGS. 1 through 3. Instead, a coil spring or any other conventional means for applying the urging force required for the position switching operations can be employed. Further, it is also conceivable to cause the urging force of the toggle spring to affect the control unit for controlling the swivel member.

The selector mechanism can alternately be of a slide operation type for translating the limiting member, a push operation type and any other type. Also, it is conceivable for the limiting member to limit a control unit or member of the clutch mechanism rather than the clutch mechanism per se.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A double-bearing type fishing reel comprising:
    a side case;
    a spool having an axis;
    a handle coupled to a drive mechanism, said drive mechanism rotating said spool in response to rotation of said handle;
    a clutch mechanism connected between said drive mechanism and said spool and including a swivel member pivotable about said spool axis, a toggle means, a shifter and an input gear,
    said swivel member being pivotable in a first pivotal direction for switching said clutch mechanism from a clutch engaging range to a clutch disengaging range and also in a second pivotal direction for switching said clutch mechanism from said clutch disengaging range to said clutch engaging range, said swivel member including a cam disc for switching said clutch mechanism,
    one end of said toggle means being supported by a projection defined on said side case, the other end of said toggle means being engaged with a projection defined on said swivel member,
    said toggle means being capable of providing an urging force in a reversible manner either in a direction for urging said swivel member in said first pivotal direction or in a further direction for urging said swivel member in said second pivotal direction,
    said projection defined in the side case and said axis of the spool defining a virtual straight line connected therebetween, said straight line acting as a dead point of said toggle means across which the direction of the urging force of the toggle means is reversed,
    a control member coupled with said swivel member and operable to move between a first position where said swivel member is moved to said clutch engaging range and a second position where said swivel member is moved to said clutch disengaging range; and
    a selector mechanism including a limiting member and a lever, said selector mechanism being operable between a toggle mode in which said limiting member is incapable of engaging with said projection of said swivel member, and a momentary mode in which said limiting member is engageable with said projection of said swivel member, said limiting member being operable independently of said toggle means;
    (1) wherein, in said toggle mode, as said control member is moved with application of an operating force thereto from said first position to said second position, said swivel member is pivoted in said first pivotal direction to switch the clutch mechanism from said clutch engaging range to said clutch disengaging range, and said toggle means is moved beyond said dead point to switch over the direction of the urging force thereof so as to urge said swivel member in said first pivotal direction thereby to maintain the swivel member at said clutch disengaging range;

(2) wherein, in said momentary mode, as said control member is moved with application of an operating force thereto from said first position to said second position, said swivel member is pivoted in said first pivotal direction to switch the clutch mechanism from said clutch engaging range to said clutch disengaging range, and said toggle means is prevented from moving beyond said dead point with said limiting member limiting a limiting projection of said swivel member; and with release of said operating force to the control member, said toggle means pivots said swivel member in said second pivotal direction thereby to restore said swivel member from said clutch disengaging range to said clutch engaging range.

2. A fishing reel as defined in claim 1 wherein said clutch mechanism further includes an engaging portion formed in a spool shaft rotatable with said spool and a slide element engageable with said engaging portion.

3. A fishing reel as defined in claim 2, wherein said slide element is engaged with a shifter movable along a pair of shafts disposed substantially parallel with and at upper and lower positions relative to said spool shaft.

4. A fishing reel as defined in claim 1, wherein said swivel member is operatively connected with a pivot element having an intermediate portion thereof depressed by a projecting pin of said control member and a rear end portion thereof pivotably supported to a right side plate of a reel body.

5. A fishing reel as defined in claim 1, wherein said limiting member is pivotably supported to an outer wall member of a right side case of a reel body and is switched over between a toggle mode position and a momentary mode position by operation of a switching lever.

* * * * *